April 19, 1927. 1,625,319
J. E. KENERSON
APPARATUS FOR SECURING VISES TO POSTS, POLES, OR THE LIKE
Filed May 8, 1926
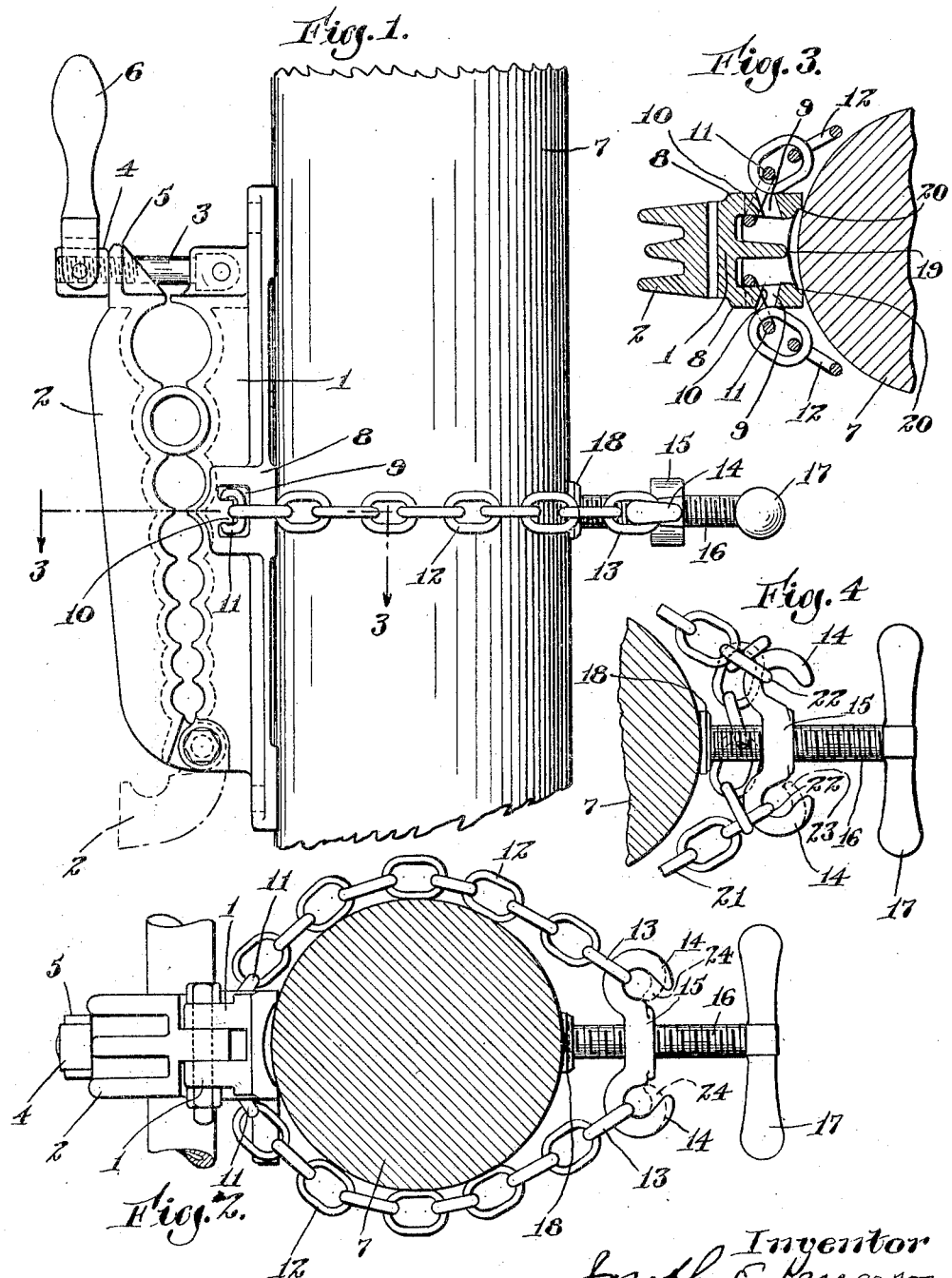

Patented Apr. 19, 1927.

1,625,319

UNITED STATES PATENT OFFICE.

JOSEPH E. KENERSON, OF SAUGUS, MASSACHUSETTS, ASSIGNOR TO TRIMONT MANUFACTURING COMPANY, OF ROXBURY, MASSACHUSETTS, A CORPORATION OF MASSACHUSETTS.

APPARATUS FOR SECURING VISES TO POSTS, POLES, OR THE LIKE.

Application filed May 5, 1926. Serial No. 106,863.

My present invention is a novel and improved method of attaching vises, such as pipe vises, to posts, poles, Lally columns or the like, and includes as a part thereof novel apparatus for use therein and is particularly applicable to pipe vises of the type illustrated in my prior and copending application Ser. No. 86,415, filed Feb. 6, 1926.

In utilizing vises of this type "on the job", great difficulty has been heretofore experienced in securing same firmly in position, where benches, tables or the like supports were not available.

A principal object of the present invention, therefore, is to provide means for firmly and rigidly securing such vises to posts, poles, Lally columns, or even to trees, if necessary.

A further feature of the invention is to so construct such vise-securing means so that they will be simple of operation, efficient in action, readily adjustable, and economical to manufacture.

In carrying out my present invention, I provide reinforcing portions on the base jaw of my novel vise and at each side thereof, and so core the same as to leave downwardly projecting lugs therein. Into the cored apertures and over the lugs are attached links of a chain, or chains. The vise being placed in position against the Lally column, for example, the chains are passed around the column and attached to a threaded nut, said nut having two oppositely positioned hooks thereon. This nut is on a threaded stem which has a swiveled flange for bearing against the post or Lally column and on the opposite end has a handle for rotating the stem in the swivel. Rotation of the stem causes the hooked nut to ride up or down on the stem, loosening or tightening the tension, as desired, on the chains. Rotating the handle and drawing the nut upwardly on the stem will pull the chains taut around the post or column, and thus hold the vise rigidly in position thereon.

I believe that my method of attaching vises, as well as the apparatus for use in carrying out said method, are novel, and I claim the same herein.

Further features of the invention, novel combinations of parts, and advantages, will be hereinafter more fully pointed out and claimed.

Referring to the drawings, illustrating a preferred embodiment of my invention.

Fig. 1 is a side elevation of a vise in position, secured by my novel apparatus;

Fig. 2 is an end view of the structure of Fig. 1;

Fig. 3 is a cross-sectional detail on the line 3—3 of Fig. 1, and

Fig. 4 is a detail illustrating the use of a single chain instead of two separate chains.

As shown in the drawings, my invention is applied to a graduated pipe clamping vise having a base jaw 1 and upper hinged jaw 2, held in closed position by a collar 4 threaded on a stem 3 and abutting against a yoke 5, the collar being rotated by a handle 6.

The vise is illustrated as applied to a post or column 7. On the base jaw 1 are provided reinforcing portions 8 which are cored at 9 to leave projecting lugs 10. Into the cored openings 9 and over the lugs 10 are fitted the links 11 of chains 12. These chains 12 extend around the column and the links 13 thereof engage the hooks 14 of the nut 15, this nut being threaded on a stem 16 having a handle 17 on one end and a swiveled flange 18 on the other end. The flange 18 is adapted to abut against the side of the post or column opposite the vise and the stem 16 is then rotated by the handle 17, raising the nut 15 on the stem 16 and tightening the chains 12 until the vise is firmly and securely held against the post or column 7. The bottoms of the reinforcing portions 8 are arcuate, as shown at 19 to permit better positioning upon a rounded surface, and the sides 20, being relatively sharp, will effect a biting grip on the column, thus still further tending to keep the vise rigid against movement.

As shown in Fig. 4 I may utilize a single chain 21 in place of the two separate chains 12, in which case any suitable pair of links, such as 22, would be attached to the hooks 14 and the chain tightened in the same manner as described for the two chains 12. When the operator has finished the use of the vise, the same is quickly and easily removed by rotating the nut 15 downwardly on the stem 16, or toward the pole, releasing the chains and removing the vise.

It will thus be seen that my novel apparatus enables a vise of this nature to be readily attached to posts, poles, Lally columns, trees or the like "on the job", will permit ready adjustment of the same, and quick removal, with a minimum of moving parts.

While I have necessarily described my invention somewhat in detail, it will be appreciated that I may vary the size, shape and arrangement of parts within reasonably wide limits without departing from the spirit of the invention. It will also be appreciated that I am not limited to the use of chains in my novel device, but may utilize wire, rope or other adjustable devices, so long as they are provided with eyes or rings or links to fit over the hooks 14 and lugs 10.

As illustrated in Fig. 2, wherein I utilize two separate chains, I may desire to have the hooks 14 on the nut 15 substantially closed, as illustrated in dotted lines at 24, thus insuring keeping the chains connected to the vise attaching apparatus. The chains 12 will be made of sufficient length to accommodate varying sizes of posts or the like, and in the event of applying the vise to a post smaller than illustrated in the present drawings, the chains could be shortened by attaching links other than the end links to the lugs 10. Also as illustrated in Fig. 4, in dotted lines at 23, I may make one of the hooks 14 substantially closed, so that the single chain utilized will be at all times connected to the vise-attaching apparatus, and thus insure against loss of the same.

My invention is further described and defined in the form of claims as follows:

1. Apparatus of the kind described, comprising a vise, a plurality of reinforcing portions on the bottom of said vise and formed arcuate and with relatively sharp edges for firm seating on one side of a support, certain of said reinforcing portions having openings on the sides thereof with projecting lugs therein, chains removably attached to said lugs and adapted to encircle said support, adjustable chain tightening means on the side of the support opposite to the said vise, said tightening means comprising a threaded stem bearing in a swivel against the support, a handle for rotating said threaded stem in said swivel, and a nut mounted on said stem and having a pair of hooks to receive links of said chains.

2. Apparatus of the kind described, comprising a vise, a plurality of reinforcing portions on the bottom of said vise and formed arcuate and with relatively sharp edges for firm seating on one side of a support, certain of said reinforcing portions having openings on the sides thereof with propecting lugs therein, a chain removably attached to said lugs and adapted to encircle said support, adjustable chain tightening means on the side of the support oppose to the said vise, said tightening means comprising a threaded stem bearing in a swivel against the support, a handle for rotating said threaded stem in said swivel, and a nut mounted on said stem and having a pair of hooks to receive links of said chain.

In testimony whereof, I have signed my name to this specification.

JOSEPH E. KENERSON.